United States Patent Office 3,288,619
Patented Nov. 29, 1966

3,288,619
DRY GRANULAR AZO DYESTUFF PREPARATIONS CONTAINING A CELLULOSE ESTER
Arthur Buehler, Rheinfelden, Christian Zickendraht, Binningen, and Robert Schoenenberg, Riehen, Switzerland, assignors to Ciba Limited, Basel, Switzerland, a company of Switzerland
No Drawing. Filed Oct. 10, 1962, Ser. No. 229,749
Claims priority, application Switzerland, Oct. 16, 1961, 12,008/61; Aug. 13, 1962, 9,686/62
17 Claims. (Cl. 106—193)

In the case of water-insoluble, film-forming substances that can be spun into foils, ribbons or fibers, the presence of water-soluble salts or other water-soluble substances can often be very undesirable. This is particularly the case where colored spinning masses are concerned, since the stability of the said masses and the execution of the spinning process are adversely affected by water-soluble salts in that, for example, the filters and spinnerets have to be changed frequently. In such cases the use of dyestuffs free from electrolytes offer substantial advantages. However, the manufacture of dyestuffs that are practically free from electrolytes and suitable for spin dyeing is very difficult, and it is virtually impossible to remove electrolytes before the dyestuffs are added to the spinning solution.

The present invention is based on the observation that new, valuable dyestuff preparations that have a low electrolyte content or that are practically free from electrolyte, and that are specially suitable for spin-dyeing can be obtained when organic, metal-lizable dyestuffs are treated with cellulose esters in an aqueous medium either during or after the metallization process.

As cellulose esters there are used primarily those that contain residues of low-molecular acids. Especially advantageous is the use of a cellulose acetate, for example, cellulose triacetate or the usual cellulose acetate (the so-called 2½-acetate). However, undernitrated cellulose can also be used.

As metal-containing dyestuffs there may be mentioned more especially the metal-containing azo dyestuff complex compounds, especially monoazo dyestuffs that contain chromium or cobalt. There can be used cobalt and chromium complexes of ortho:ortho'-dihydroxy-monoazo dyestuffs and ortho-hydroxy-ortho'-amino-monoazo dyestuffs, and also chromium complex compounds that contain ortho-carboxy-ortho'-hydroxy-monoazo dyestuffs bound in complex union, advantageously those that are free from sulfonic acid groups and from carboxyl groups that are not in a position vicinal to the azo bridge; however, with the exception of sulfonic acid groups and carboxyl groups, the dyestuffs may contain a very wide variety of nonionic substituents, such as chlorine atoms and nitro, alkyl, alkoxy, alkyl-sulfoxide and alkyl sulfonic groups. There are used not only the pure metal complexes, but also the reaction products thereof with colorless or colored amines.

The metal complexes to be used in the process of the invention are known in large numbers and can be made by known methods (c.f. French specifications 1,030,656; 1,074,562; 1,061,329; 1,061,365; 1,067,470/1,067,449; 1,085,262; 1,098,830; 1,148,147; 1,208,532; 1,264,391. Swiss applications No. 9,047/61 filed August 2, 1961, and No. 3,912/62 filed March 30, 1962.

The reaction of the metal-containing dyestuff with the cellulose ester in the process of the invention can be carried out after or, advantageously, during the manufacture of the dyestuff if the manufacture is carried out in aqueous medium. To the aqueous manufacturing medium of the dyestuff preparations of the invention there is advantageously added a substance which has a swelling and/ or at least partially dissolving action on the cellulose esters to be used, such substances being, for example, alcohols (ethyl or isopropyl alcohol, glycol, ethylene glycol monomethyl ether, and the like) or esters (for example, ethyl acetate).

The cellulose esters are generally added in pulverized form or some other fine form. The amount of cellulose ester used can be varied at will, but the amount is advantageously chosen in such a manner that the resulting dyestuff preparation is not too highly diluted with colorless material; for example, the cellulose esters can be charged with dyestuff to the saturation point. There can be used up to 4 parts of cellulose ester to 1 part of dyestuff, but the preparations that are of most value technically are obtained with 0.3 to about 1.5 part of cellulose ester to 1 part of dyestuff.

The reaction of the cellulose esters with the metal-containing dyestuffs in the process of the invention can be carried out under atmospheric pressure or under superatmospheric pressure at 50 to 120° C.

Apart from the presence of cellulose esters in the reaction medium, the metallization is carried out with the usual metal-yielding agents, such as cobalt or chromium compounds of aliphatic hydroxy-carboxylic acids or dicarboxylic acids, and chromium compounds of aromatic ortho-hydroxy-carboxylic acids that contain the metal bound in complex union. As examples of aliphatic hydroxy-carboxylic acids and dicarboxylic acids there may be mentioned, inter alia, oxalic acid, lactic acid, glycolic acid, citric acid and more especially tartaric acid, whereas as examples of the aromatic ortho-hydroxy-carboxylic acids there may be mentioned those of the benzene series, such as 4-, 5-, of 6-methyl-1-hydroxybenzene-2-carboxylic acid and more especially 1-hydroxy-benzene-2-carboxylic acid, which is not further substituted. As cobalt-yielding agents there can also be used simple compounds of divalent cobalt, such as cobalt sulfate or cobalt acetate.

In the case of dyestuffs that can only be converted into their heavy-metal complexes under conditions that might bring about even only partial hydrolysis of the cellulose ester used, it is advisable to carry out the metallization first and to heat the resulting complex with the cellulose ester in aqueous medium at a later stage.

After the metallization, the resulting preparations of complex dyestuff-metal compounds with cellulose esters can easily be isolated by filtration and, if necessary, washed with water for further removal of electrolytes, and then dried.

The dyestuff preparations of complex metal compounds with cellulose esters of the present invention which have a low electrolyte content or which are practically free from electrolytes are new. They are soluble in organic solvents, such as esters, alcohol, and especially acetone. Thus, they are specially suitable for the preparation of colored cellulose ester films, foils and fabricated shapes and for the spin coloration of cellulose acetate rayon. The preparations of the invention are soluble in acetone and spinning compositions without leaving a residue; they are easily dissolved and have an excellent filtration value.

The following examples illustrate the invention. Unless otherwise stated, the parts and percentages in the examples are by weight, and the relationship between parts by weight and parts by volume is the same as that between the gram and the cubic centimeter.

*Example 1*

34.3 parts of a dyestuff prepared from diazotized 1-hydroxy-2-aminobenzene-4-sulfonic acid amide and 2-hydroxynaphthalene are suspended in 300 parts of water. After the addition of 200 parts of isopropylalcohol, 100 parts of a cobalt acetate solution containing 0.25 part of cobalt, 20 parts of crystallized sodium acetate and 20 parts of powdered cellulose acetate, the mixture is heated for 30 minutes. The alcohol is then distilled off and the residue is filtered. The filter residue is washed with water and dried. The dyestuff preparation so obtained is a red, fine-grained powder that dissolves readily in cellulose acetate solution to give a bluish red tint.

*Example 2*

34 parts of a dyestuff prepared from diazotized 4-nitro-1-hydroxy-2-aminobenzene and 1-phenyl-3-methyl-5-pyrazolone are suspended in 200 parts of water. After the addition of 30 parts of sodium hydroxide solution of 15% strength, 200 parts of isopropyl alcohol and 100 parts of a cobalt-tartaric acid solution containing 0.05 mol of cobalt and 0.05 mol of tartaric acid, the mixture is heated for 2 hours under reflux. The mixture is then neutralized with acetic acid, and 40 parts of finely powdered cellulose acetate are added. The mixture is then stirred for 1 hour under reflux, and working up is then carried out as described in Example 1. The orange-colored dyestuff preparation so obtained dyes a cellulose acetate solution an orange tint.

*Example 3*

30 parts of the rhodamine salt of a chromium-containing dyestuff prepared from diazotized 4-chloro-2-amino-1-hydroxy-benzene-5-sulfonic acid amide and 1-phenyl-3-methyl-5-pyrazolone are suspended in 250 parts of water. After the addition of 250 parts of isopropyl-alcohol and 30 parts of cellulose acetate (2½-acetate), the suspension is boiled for 1 hour under reflux, while stirring. The alcohol is then distilled off and the residue is filtered. The filter residue is then thoroughly washed with water and then dried. The dyestuff preparation so obtained dissolves in a cellulose acetate solution to give a bright, bluish red tint.

*Example 4*

20.7 parts of a dyestuff prepared from diazotized 2-amino - 1 - hydroxybenzene - 4 - sulfonic acid - N - isopropyl amide and 1 - phenyl - 3 - methyl - 5 - pyrazolone, and 19.2 parts of a dyestuff prepared from diazotized 2 - amino - 1 - hydroxybenzene - 4 - sulfonic acid - N-isopropyl amide and 2 - hydroxynaphthalene are suspended in 200 parts of water. After the addition of 300 parts of isopropyl alcohol, 30 parts of cellulose acetate (2½-acetate), 40 parts of sodium acetate and 100 parts of a chromium acetate solution containing 2.6 parts of chromium, the mixture is boiled for 20 hours under reflux, while stirring. The alcohol is then distilled off, the residue is filtered, and the filter residue is washed with water. There is obtained a dark brown dyestuff preparation that dissolves in a cellulose acetate solution to give a red-brown tint.

From the dyestuffs listed in Column I of the following table preparations can be prepared in an analogous manner. When dissolved in cellulose acetate solutions, they give the tints listed in Column III. The metal used in each case is given in Column II.

| | I | II | III |
|---|---|---|---|
| 1 | $O_2N-$⬡(OH)$-N=N-$⬡($H_2N$)(with $NO_2$ on first ring, naphthalene second) | Co | Olive. |
| 2 | (OH)⬡($NO_2$)$-N=N-CH(COCH_3)(CO-NH-$⬡) | Co | Yellow. |
| 3 | $O_2N-$⬡(OH)$-N=N-$⬡(HO)(Cl)(Cl) naphthalene | Co | Navy blue. |
| 4 | $O_2N-$⬡(OH)$-N=N-$⬡($NH_2$) naphthalene | Co | Green. |
| 5 | $O_2N-$⬡(OH)$-N=N-$⬡(NH-⬡-COOH) | Cr | Green. |

| | I | II | III |
|---|---|---|---|
| 6 | 2-hydroxy-4-nitrophenyl azo pyrazolone with N-(2-chloro-6-methylphenyl) substituent | Cr | Bluish red. |
| 7 | 2-hydroxy-3-nitro-5-chlorophenyl azo pyrazolone with N-(2-chloro-6-methylphenyl) substituent | Cr | Bluish red. |
| 8 | 2-hydroxy-5-chlorophenyl azo pyrazolone with N-(4-methylphenyl) substituent | Co | Orange. |
| 9 | 2-hydroxy-3-chloro-5-nitrophenyl azo 1-hydroxy-2-acetamido-naphthalene | Cr | Grey. |
| 10 | 2-hydroxy-3-chloro-5-nitrophenyl azo 1-hydroxy-2-acetamido-naphthalene | Co | Grey. |
| 11 | 2-hydroxy-4-chlorophenyl azo 1-hydroxy-8-chloro-5-chloro-naphthalene | Co | Violet. |
| 12 | 2-hydroxy-3-chloro-5-chlorophenyl azo pyrazolone with N-phenyl substituent | Cr | Scarlet. |

| | I | II | III |
|---|---|---|---|
| 13 | HO-C6H3(NO2)-N=N-C6H3(OH)(NH-COCH2CH3) | Co | Brown. |
| 14 | Cl-C6H2(OH)(NO2)-N=N-naphthyl(HO) | Cr | Violet brown. |
| 15 | O2N-C6H2(OH)(Cl)-N=N-C(HO-C)=C(CH3)-N(phenyl)-N (pyrazolone) | Co | Orange. |
| 16 | HO-C6H3(NO2)-N=N-C6H2(OH)(CH3)(CH3) | Co | Brown. |

Example 5

17.2 parts of a dyestuff prepared from diazotized 1-hydroxy - 2 - aminobenzene - 4 - sulfonic acid amide and 2 - hydroxy - naphthalene are stirred into 150 parts of water and 100 parts of isopropyl alcohol. After the addition of 10 parts of nitrocellulose, 50 parts of a cobalt acetate solution containing 1.5 parts of cobalt, and 10 parts of crystallized sodium acetate, the mixture is boiled for two hours under reflux. The alcohol is then distilled off, the residue is filtered, and the filter residue is washed with water. The dried dyestuff preparation is a dark brown powder that dissolves in nitrocellulose lacquer to give a bluish red tint.

Example 6

30 parts of a chromium-containing dyestuff mixture complex prepared from a dyestuff made from diazotized 4 - nitro - 2 - amino - 1 - hydroxy - benzene and 2 - hydroxynaphthalene and a dyestuff made from diazotized 4 - nitro - 2 - amino - 1 - hydroxy - benzene and 1 - acetylamino - 7 - hydroxynaphthalene are converted into a diphenylguanidine salt by the process described in patent application No. 3,912/62 (Case 5054), and the guanidine salt so obtained is stirred in 500 parts of n-propyl-alcohol of 50% strength. After the addition of 40 parts of cellulose acetate, the reaction mixture is heated to the boil and maintained for 1 hour under reflux. The alcohol is then distilled off and the residue is filtered. The dyestuff preparation so obtained colors cellulose acetate solution neutral grey to black tints, depending on the quantity used, that possess an excellent fastness to light.

Example 7

15 parts of a dyestuff prepared from diazotized 5-nitro-2-amino-1-hydroxybenzene and 2-hydroxynaphthalene are suspended in 400 parts of n-propyl alcohol of 50% strength. After the addition of 50 parts of a cobalt-tartaric acid solution containing 0.025 part of cobalt and 0.025 part of tartaric acid, there are added 15 parts of a sodium hydroxide solution of 15% strength and 20 parts of crystallized sodium acetate, and the whole is stirred for 1 hour under reflux. 20 parts of sodium chloride and 20 parts of cellulose acetate are then added and boiling is continued for a further hour under reflux. Working up is carried out as described in the preceding example and there is obtained a violet-black powder which colors cellulose acetate solutions bluish violet tints.

Example 8

30 parts of the cobalt complex of a dyestuff prepared from diazotized 2-amino-1-hydroxybenzene-4-sulfonic acid amide and 2-hydroxynaphthalene, the complex precipitated as isopropylamine salt, are stirred in 500 parts of iso-propyl alcohol of 50% strength and, after the addition of 40 parts of powdered cellulose acetate, the mixture is stirred for 1 hour at the boil under reflux. After distilling off the alcohol, there is obtained a dyestuff preparation that, when filtered, washed and dried, colors cellulose acetate solutions bluish red tints.

Example 9

17 parts of a dyestuff prepared from diazotized 2-aminobenzene-1-carboxylic acid and 1(2'-methylphenyl) 3-methyl-5-pyrazoline are suspended in 100 parts of water and 200 parts of n-propyl alcohol. After the addition of 100 parts of a chromium acetate solution containing 2.6 parts of chromium, the mixture is boiled for 20 hours under reflux. 20 parts of crystallized sodium acetate and 20 parts of powdered cellulose acetate are then added and the whole is stirred for a further hour under reflux. Working up is carried out as described in the other examples and there is obtained a dark yellow dyestuff preparation that dissolves in a cellulose acetate solution to give a greenish yellow tint possessing an excellent fastness to light.

Example 10

40 parts of powdered cellulose acetate are introduced into 400 parts of acetic acid ethyl ester and the whole is stirred for some time at 40 to 45° C. To the jelly-like mass so obtained is added a suspension consisting of 34.3 parts of a dyetuff prepared from diazotized 1-hydroxy-2-amino-benzene-4-sulfonic acid amide and 2-hydroxy naphthalene, 300 parts of water, 20 parts of crystallized sodium acetate, and 100 parts of a cobalt-acetate solution containing 0.05 part of cobalt, and the whole is stirred for 1 hour under reflux. After the addition of 400 parts of water, the ethyl ester is distilled off with steam. There is obtained a fibrous dyestuff preparation which, when dry, dissolves in a cellulose acetate solution to give a bluish red tint.

Example 11

20 parts of nitrocellulose are dissolved in 200 parts of acetic acid ethyl ester, while stirring. To the solution so obtained there is added a suspension consisting of 16 parts of a dyestuff prepared from diazotized 4-chloro-2-amino-1-hydroxybenzene and 1-phenyl-3-methyl-5- pyrazolone in 150 parts of water, 50 parts of a cobalt acetate solution containing 0.025 mol of cobalt and 20 parts of sodium acetate, and the whole is boiled for 1 hour under reflux. The reaction mixture is then diluted with 200 parts of water and the acetic acid ethyl ester is distilled off. The dried dyestuff preparation dissolves in ethanol to give an orange tint.

Example 12

17.6 parts of a dyestuff prepared from diazotized 4-nitro-2-amino-1-hydroxybenzene and 1-(4'-methyl-phenyl)-3-methyl-5-pyrazolone are stirred into 150 parts of water. A cobalt complex solution consisting of 50 parts of an aqueous solution obtained by dissolving cobalt sulfate and tartaric acid in water and containing 1.47 parts of cobalt and 3.75 parts of tartaric acid is added, along with 10 parts of sodium hydroxide solution of 30 percent strength, 20 parts of sodium acetate, 200 parts of n-propylalcohol, and 5 parts of glacial acetic acid, and the mixture refluxed for 1 hour. 55 parts of granulated acetyl cellulose are then added, the whole stirred for 30 minutes while being refluxed, and the alcohol then distilled off. The dyestuff preparation is then filtered off and dried. The product so obtained dissolves in cellulose acetate solution to give an orange coloration.

Example of spin-coloration 8 parts of a dyestuff preparation prepared in the manner described in Example 1 are sprinkled into 1000 parts of a spinning solution consisting of 26% of cellulose acetate and 74% of acetone, while stirring. When all the dyestuff has been added, stirring is continued until a clear, homogeneous solution is obtained.

The spinning solution so obtained can be spun as it is, without filtration, by the usual methods in a dry-spinning plant, and yields a brilliant yarn having a deep red tint.

What is claimed is:

1. A dry, granular dyestuff preparation practically free from electrolyte which consists substantially of one part of a complex heavy metal compound of an azo dyestuff and 0.5 to 2 parts of a cellulose ester.

2. A dry, granular dyestuff preparation as claimed in claim 1 wherein the cellulose ester is cellulose acetate.

3. A dry, granular dyestuff preparation as claimed in claim 1 wherein the cellulose ester is nitrocellulose.

4. A dry, granular dyestuff preparation as claimed in claim 1 wherein the complex heavy metal compound is a 1:2-chromium complex.

5. A dry, granular dyestuff preparation as claimed in claim 1 wherein the complex heavy metal compound is a 1:2-cobalt complex.

6. A dry, granular dyestuff preparation consisting substantially of one part of a 1:2-cobalt complex compound of a mono azo dyestuff free from sulfonic and carboxylic acid groups and 0.5 to 2 parts of cellulose acetate.

7. A dry, granular dyestuff preparation consisting substantially of one part of a 1:2-chromium complex compound of a mono azo dyestuff free from sulfonic and carboxylic acid groups and 0.5 to 2 parts of cellulose acetate.

8. A dry, granular dyestuff preparation consisting substantially of 0.5 to 2 parts of cellulose acetate and one part of a 1:2-chromium complex compound of a mono azo dyestuff of the o-hydroxy-benzeneazo naphthol series free from sulfonic and carboxylic acid groups.

9. A dry, granular, dyestuff preparation consisting substantially of 0.5 to 2 parts of cellulose acetate and one part of a 1:2-chromium complex compound of a mono azo-dyestuff of the o-hydroxy-benzene-azo pyrazolone-5 series free from sulfonic and carboxylic acid groups.

10. A dry, granular dyestuff preparation consisting substantially of 0.5 to 2 parts of cellulose acetate and one part of a 1:2-chromium complex compound of mono azo-dyestuff of the o-carboxy benzene-azo-pyrazolone-5 series free from sulfonic and carboxylic acid groups.

11. A dry, granular dyestuff preparation consisting substantially of 0.5 to 2 parts of cellulose acetate and one part of a 1:2-cobalt complex compound of a mono azo dyestuff free from sulfonic and carboxylic acid groups and selected from those of the o-hydroxy benzene-azo-acetoacetylamide, the o-hydroxy benzene-azo-pyrazolone-5, the hydroxybenzene-azo-α-naphthol and the hydroxy benzene-azo-β-naphthol series.

12. The dry, granular dyestuff preparation consisting substantially of 1.5 part of acetylcellulose and one part of the 1:2-cobalt complex compound of the mono azo dyestuff of the formula

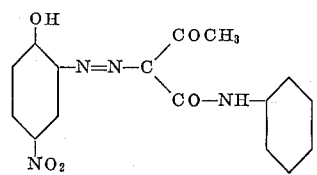

13. The dry, granular dyestuff preparation consisting substantially of 1.5 part of acetylcellulose and one part of the 1:2-cobalt complex compound of the mono azo dyestuff of the formula

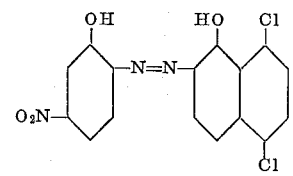

14. The dry, granular dyestuff preparation consisting substantially of 1.5 part of acetylcellulose and one part of the 1:2-cobalt complex compound of the mono azo dyestuff of the formula

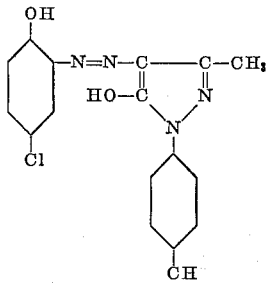

15. The dry, granular dyestuff preparation consisting substantially of 1.5 part of acetylcellulose and one part of the 1:2-cobalt complex compound of the mono azo dyestuff of the formula

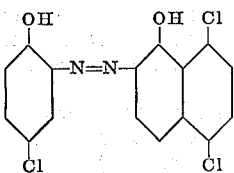

16. The dry, granular dyestuff preparation consisting substantially of 1.5 part of acetylcellulose and one part of the 1:2-chromium complex compound of the mono azo dyestuff of the formula

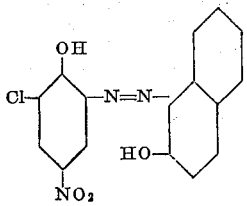

17. The dry, granular dyestuff preparation consisting substantially of 1.5 part of acetylcellulose and one part of the 1:2-chromium complex compound of the mono azo dyestuff of the formula

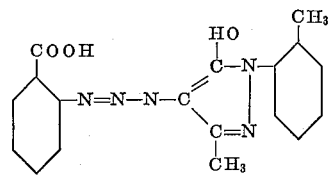

References Cited by the Examiner

UNITED STATES PATENTS

| | | | |
|---|---|---|---|
| 1,656,844 | 1/1928 | Straub et al. | 260—149 |
| 1,877,615 | 9/1932 | Straub et al. | 106—193 |
| 2,649,383 | 8/1953 | Killian et al. | |
| 2,669,561 | 2/1954 | Schmelzer et al. | |
| 2,701,211 | 2/1955 | Taylor et al. | |
| 2,841,576 | 7/1958 | Zickendraht et al. | 260—149 X |
| 2,868,662 | 1/1959 | Ingham et al. | 106—193 |
| 2,880,106 | 3/1959 | Hawtin et al. | 106—198 |
| 2,998,544 | 6/1961 | Frey. | |

FOREIGN PATENTS 465,167  4/1937  Great Britain.

ALEXANDER H. BRODMERKEL, *Primary Examiner.*

MORRIS LIEBMAN, *Examiner.*

D. J. ARNOLD, *Assistant Examiner.*